(12) United States Patent
Bowman et al.

(10) Patent No.: US 7,797,258 B1
(45) Date of Patent: Sep. 14, 2010

(54) GRAPHICS SYSTEM TRANSPOSER READ SCHEDULER

(75) Inventors: James C. Bowman, Pescadero, CA (US); Dane T. Mrazek, Redwood City, CA (US); Sameer M. Gauria, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 936 days.

(21) Appl. No.: 11/556,141

(22) Filed: Nov. 2, 2006

(51) Int. Cl.
*G06E 1/00* (2006.01)
*G06E 3/00* (2006.01)
*G06F 15/18* (2006.01)
*G06G 7/00* (2006.01)
*G06T 1/00* (2006.01)
*G06T 15/00* (2006.01)

(52) U.S. Cl. ........................................ 706/19; 345/522
(58) Field of Classification Search .................. None
See application file for complete search history.

(56) References Cited

OTHER PUBLICATIONS

D.P. Bertsekas, J. N. Tsitsiklis and C. Wu; "Rollout Algorithms for Combinatorial Optimization"; Kluwer Academic Publishers; Journal of Heuristics, 3; pp. 245-262; Nov. 1997.*

J. Bang-Jensen, G. Gutin and A. Yeo; "When the Greedy Algorithm Fails"; Discrete Optimization, vol. 1, Issue 2; pp. 121-127; Nov. 2004.*

Microsoft Corporation; Microsoft Computer Dictionary, 5th Ed., definition for table lookup; Microsoft Press; May 2002; "Microsoft" hereinafter.*

* cited by examiner

*Primary Examiner*—Kee M Tung
*Assistant Examiner*—Carlos Perromat
(74) *Attorney, Agent, or Firm*—Cooley LLP

(57) ABSTRACT

A graphics system includes a transposer. A read scheduler utilizes a minimum cost analysis to schedule a read transfer order for the transposer to minimize the total number of passes required to process a set of input vectors.

10 Claims, 4 Drawing Sheets

Input Compression Table For Vectors of Size 1

Input Compression Table For Vectors of Size 2

Input Compression Table For Vectors of Size 3

Input Compression Table For Vectors of Size 4

FIG. 3

GRAPHICS SYSTEM TRANSPOSER READ SCHEDULER

FIELD OF THE INVENTION

The present invention is generally related to transposers. More particular, the present invention is directed towards scheduling read operations for a transposer of a graphics system.

BACKGROUND OF THE INVENTION

Graphics systems sometimes include a transposer to change the format of data. In particular, memory sometimes stores data in a representation different than that which is required for certain data operations. As one example, memory may store a representation of vertex data in an array-of-structures format, i.e., vertex attributes X, Y, and Z on a vertex-by-vertex basis. However, certain data operations may be more conveniently handled by changing the data format to have all of the X attributes, Y attributes, and Z attributes grouped by attribute rather than by vertex. If you imagine the vertex data laid out in rows and columns, with one row per vertex, this operation is equivalent to interchanging rows and columns, which is a transposition operation. The transposition operation is useful, for example, in converting data from memory into a format suitable for performing primitive assembly and vertex processing. For example, consider vertices 1, 2, 3 . . . n each with attributes X, Y, and Z. Then data can be represented in memory in a table format as:

$X_1 Y_1 Z_1$
$X_2 Y_2 Z_2$
$X_3 Y_3 Z_3$
$X_n Y_n Z_n$ Example 1 where each vertex can have an arbitrary number. M, of attributes (here only 3 for clarity). A transposer may be used to convert the data format into a format in which the data is transposed (the table is rotated by ninety degrees). For instance, starting with the table in Example 1, a transposer may rotate the source data into the table format:

$X_1 \ldots X_N$
$Y_1 \ldots Y_N$
$Z_1 \ldots Z_N$ Example 2 where a the rows and columns have been transposed.

One problem in a graphics system with performing transposition is determining how to efficiently schedule read operations for the transposer. In particular, a transposer may be designed to read blocks of data per pass of the transposer. If the data is fed into the transposer in an inefficient order additional passes (and therefore additional clock cycles) will be required to perform the transposition. Conventionally, a greedy algorithm is used to schedule work for a transposer. However the greedy algorithm can result in inefficient data transfer.

Therefore, in light of the above described problem, the apparatus, system and method of the present invention was developed.

SUMMARY OF THE INVENTION

A graphics system includes a transposer. A read scheduler uses a minimum cost analysis to schedule read operations for the transposer.

In one embodiment, a method of assigning work to the transposer includes receiving a set of input vectors for transposition. A read schedule is determined for feeding work to the transposer to transpose the set of input vectors. The read schedule is consistent with at least one constraint for feeding blocks of work to the transposer per pass. A minimum cost analysis is used to determine a transfer of remaining input data for transposition consistent with the at least one constraint which will minimize the total number of passes to process the set of input vectors.

One embodiment of a graphics system includes a transposer to transpose data of the graphics system from a first format into a second format. The transposer processes input data in the first format on a block-by-block basis per pass, with each block having a data transfer size. The transposer has at least one constraint on input data attributes capable of being processed per pass through the transposer. The graphics system includes a read scheduler to determine a read transfer order for scheduling blocks of work for the transposer for a set of input vectors. The read scheduler schedules a sequence of block read operations for the transposer in which for each pass of said transposer the read scheduler utilizes a minimum cost analysis to determine a transfer of remaining input data for transposition consistent with the at least one constraint which will minimize the total number of passes to process the set of input vectors.

BRIEF DESCRIPTION OF THE FIGURES

The invention is more fully appreciated in connection with the following detailed description taken in conjunction with the accompanying drawings, in which:

FIG. 3 illustrates input compression tables in accordance with one embodiment of the present invention;

Like reference numerals refer to corresponding parts throughout the several views of the drawings.

DETAILED DESCRIPTION OF THE INVENTION

Figure 1:
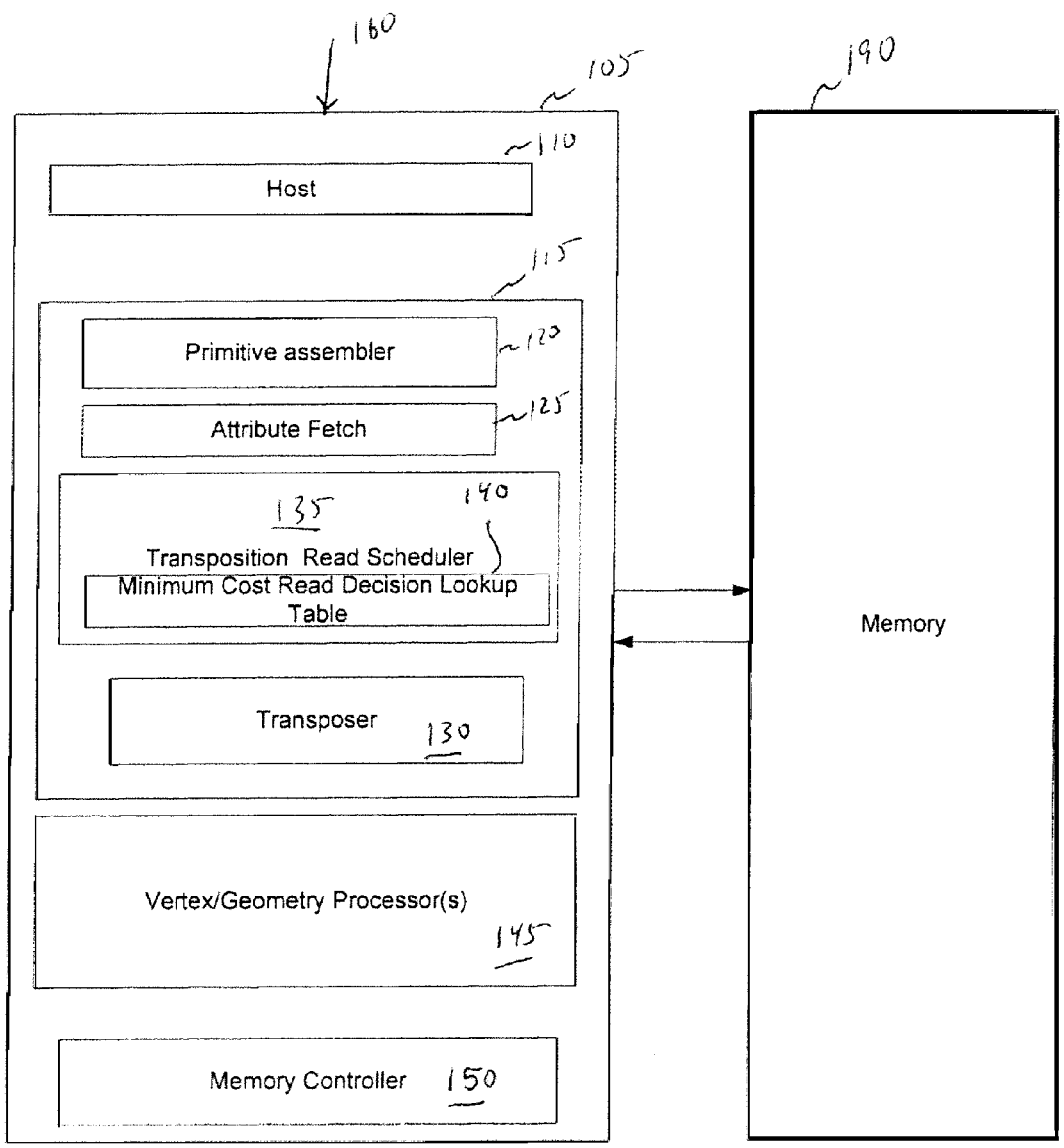
FIG. 1 illustrates a graphics system utilizing a transposer in accordance with one embodiment of the present invention.

FIG. 1 illustrates a portion of a graphics system 100. A graphics processing unit (GPU) 105 utilizes an associated memory 190 to store graphics data, such as vertex data. GPU 105 includes a host unit 110 to translate a graphics API received from a CPU (not shown) into instructions for graphics hardware. In one embodiment, a data assembler 115 includes primitive assembler 120, attribute fetch unit 125, transposer 130, and a transposition read scheduler 135. GPU 105 also includes vertex/geometry processor(s) 145. Other conventional graphics processing stages of a graphics pipeline may be included, such as a pixel shader (not shown) and a raster operations stage (not shown). A memory controller 150 is provided to communicate with memory 190 over one or more suitable buses (not shown).

GPU 105 needs to fetch vertices from memory 190, which may require a transposition be performed for certain graphics processing operations. A graphics API permits input vectors 160 requiring transposition to arrive in bunches of vectors having different numbers of components. In the most general case each bunch may have a large number of vectors with a variable number of scalar components. For example, the graphics API may permit attributes of a set of input vertex vectors to arrive with different numbers of scalar components such as X, XY, XYZ, or XYZW where each scalar component is a minimal unit of data, usually 32 bits or less. For a tiled graphics memory, it is desirable for bunches to be processed that have adjacent locations in memory 190 since this improves fetching efficiency.

Memory 190 is accessed in block-sized units to feed transposer 130, where a block may be based on a memory transfer size and/or other considerations for processing data in transposer 130. A fixed number of clocks may be associated with each block size of memory transfer. In one embodiment, transport takes input 8 vertices with 128 attributes and transposition is performed on a 8×8 blocks from a tiled memory format.

Transposer 130 is designed to operate on blocks of data. That is, input graphics data is transposed on a block-by-block basis where the transposer processes one block of data transfer per pass through the transposer. Given that in the general case there can be a large number of vectors with variable numbers of scalar components (e.g., 1-4 scalars each), efficient scheduling of work for transposer 130 is an issue. Additionally, there will be constraints on the amount of work that can be scheduled per pass through transposer 130.

Transposition read scheduler 140 schedules read operations for bunches of input vertex vectors. Depending on the block size of memory transfer and other implementation details, there will be constraints on the number of vectors and the number of scalar components that can be read by the transposer per pass. As one example, suppose that the number of scalar components of an input vector is given a numeric code where 1=x, 2=xy, 3=xyz, and 4=xyzw. Thus, in this nomenclature 4321 signifies a bunch with a set of vector inputs having one vector of size 4, one vector of size 3, one vector of size 2, and one vector of size 1 whereas 4432 signifies two vectors of size four, one vector of size three, and one vector of size two.

Depending on implementation details, there will be practical constraints on the total number of vertices per bunch, total number of input vectors per vertex in a new bunch; constraints on the number of input vectors that can be read for each pass; and constraints on the number on the total number of scalar components that can be read for each pass. As an illustrative example, suppose that a new input bunch may have eight vertices, six vectors per vertex, which each has an associated size. In this illustrative example further suppose that one constraint is that in an individual pass the attributes of a maximum of three vectors can be moved into transposer 130. Also suppose that for an individual pass a maximum of eight scalar components may be moved into transposer 130. In this example suppose that a new bunch is received having six input vectors 442222 indicating two vectors of size four and four vectors of size two. In this example, it would be valid to schedule a read of 222 for transposer 130, since it is within the constraint of three vectors and a maximum of eight scalar components. However, in contrast it would be invalid to schedule a read of 442 for transposer 130, since while there are three vector components the total number of scalar components (ten) exceeds the constraint of eight scalar components. Also note that, each pass through the transposer takes 8 clocks per pass irrespective of the number of scalar attributes because it takes 8 clocks to write 8 vertices into the transposer.

In this example, the read constraints make it possible for a greedy algorithm to give poor performance. For example, a conventional greedy algorithm might be organized to schedule work starting from some end point of the new bunch and always schedule the largest unit of work in each pass possible.

Note that the greedy algorithm does not look ahead to the consequences of particular moves, it only looks at the current move. For example, with a new bunch corresponding to 442222, a greedy algorithm could schedule a read of 44, since that is the largest possible first pass in that it has the maximum number of scalar components consistent within the constraint. However, this would still leave the remaining 2222 portion of the bunch for processing in subsequent moves. In this example, the greedy algorithm would then schedule the largest read possible for the next pass, which would be the 222 portion (since at most three vectors can be read at a time). The third pass would be the final remaining 2. In this example the greedy algorithm would require three passes through the transposer. Thus, in the above example while the first move of scheduling a read of 44 is efficient (eight scalar components read out of a maximum of eight), the two remaining moves are less efficient. The second move of scheduling a read of 222 is only 75% efficient since only six out of a maximum of eight scalar components are read. The third move is even more inefficient at 25% efficiency, since only two of a maximum of eight scalar components are read.

One aspect of the prevention invention is that transposition read scheduler 135 utilizes a minimum cost analysis to schedule reads for transposer 130. The minimum cost analysis may, for example, be based on a state analysis to determine a move (read transfer) consistent with a minimum number of passes through transposer 130. As an illustrative example, consider again the case of a new bunch of 442222. A more efficient scheduling would be in a first move to schedule a read operation of 422 for a first pass of transposer 130. The second move would then be to schedule the remaining 422 in a second pass. As a consequence the entire 442222 bunch would be processed in two passes instead of three passes as with the greedy algorithm.

In one embodiment, a minimum cost read decision lookup table 140 is provided for read scheduler 135 to lookup a move (read transfer) consistent with the transfer constraints. For example, the minimum cost read decision lookup table 140 may be implemented for scheduling reads for a new bunch of vectors consistent with the read constraints on the number of vectors that can be read per pass and the number of scalar components that can be read per pass.

The minimum cost read decision lookup table 140 may be computed using a state analysis to analyze the cost of different moves, where the cost is based on the number of clock cycles (or alternatively the number of passes) required to perform the data transfer to complete the transposition. For example, each possible new input bunch may be assigned a state. For example, assuming that a new bunch has six vectors, each new bunch is a possible input state, e.g., states such as 444444, 244444, or 224444. Each move will result in a transfer of data such that the remaining input data has a smaller data size, such as a 4444 state or a 2444 state. For each state, all possible subsequent moves in a state diagram may be calculated until all of the input data has been fed into transposer 130. The resulting state diagram may be used to calculate the final cost for a sequence of moves required to move a set of input data into transposer 130. For each state "good moves" lead along a minimum cost path along the state diagram. However, some states may have two or more equally good minimum cost moves. However, some minimum cost path sections will have a higher frequency of usage than others. Consequently, a further simplification can be achieved by selecting a minimum set of optimal good moves that favors moving along portions of frequently used minimum cost paths. Thus, for example, while a particular state A may have two equally low cost moves, a move to a state along a portion of a frequently used minimum cost path is preferred over a move to a state that is not frequently used or which would require moving along an infrequently used minimum cost path. This may also be understood in terms of a state diagram as the elimination of redundant low cost branches in favor of using a smaller total number of minimum-cost branches which are used more frequently.

Figure 2:
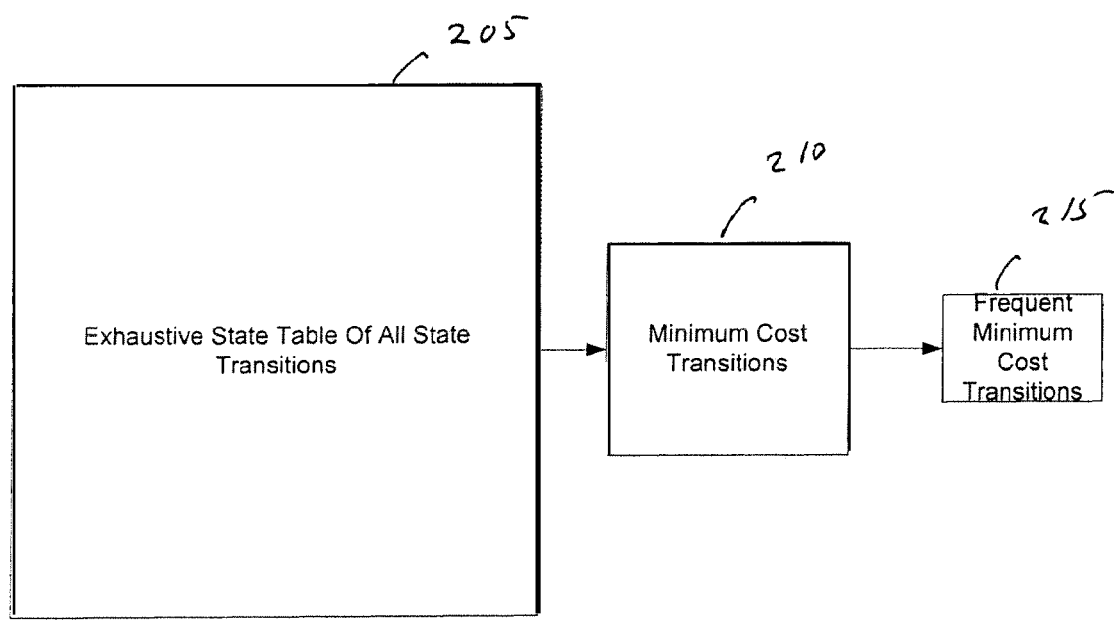
FIG. 2 illustrates a method of reducing hardware requirements for implementing a lookup table to determine an optimum read block schedule for a transposer.

FIG. 2 illustrates a method for designing a minimum cost read decision lookup table 140. An exhaustive state table of all state transitions for performing read scheduling is calculated (block 205). As indicated by the comparative area of different blocks, the exhaustive state table would be expected to require substantial storage and hence be difficult to implement in hardware for many applications. A set of minimum cost transitions is then calculated (block 210) indicating good moves for each state (block 210). A set of frequently used minimum cost transitions is then calculated to indicate one good move for each state (block 215). Examples calculated by the inventors indicate an approximately 9:1 reduction in storage requirements can occur for block 210. For example, in one case an exhaustive block 205 has 4845 states. The set of good moves in block 210 is reduced to 588 transitions. The minimal set of optimal moves in block 215 is reduced to 64 optimal moves. This large reduction in storage requirements facilitates a hardware implementation of a minimum cost read decision lookup table having a reasonable cost. Other optimizations may also be utilized to improve performance. In one implementation, the minimum cost read decision lookup table 140 includes output compression. That is, each possible next move in the lookup table is stored encoded as a number. For example, with approximately 64 possible optimal frequently used moves, the output moves can be encoded and stored as numbers 1 to 70 and then read scheduler 135 uses the number to decide on the next move. In one implementation, input compression is used. For input compression, the number of vectors of different size are counted, i.e., the number of vectors of size four, the number of size three, the number of size two, and the number of size one. The count is then used as a basis for determining moves. Counts that work the same way in regards to next move decisions are grouped into the same bucket. That is, the order of vectors in a bunch is not important to making move decisions, only the number of vectors of each size. The inputs to the table may be further compressed by combining counts that always lead to the same decision. (e.g. the same move is always picked when there are four 4's and five 4's, then the counts four and five can be merged into a single input count)

Figure 4:
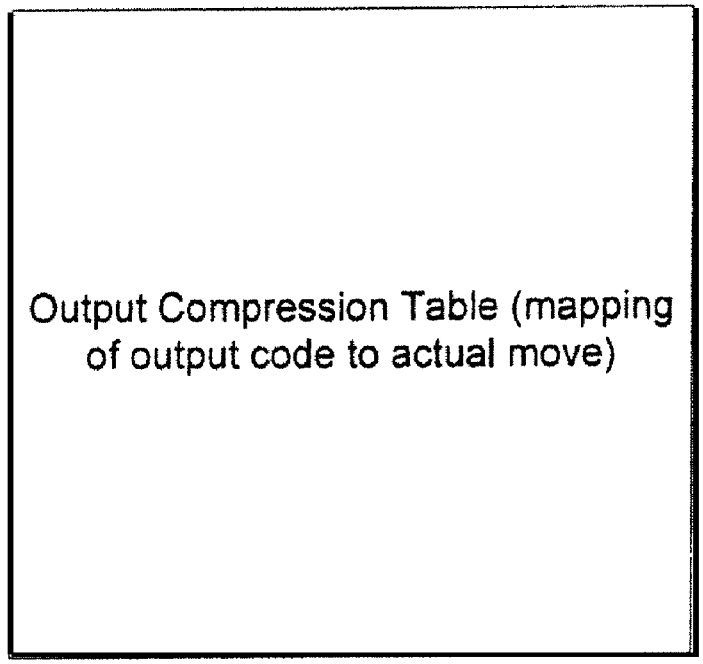
FIG. 4 illustrates an output compression table in accordance with one embodiment of the present invention.
Figure 5:
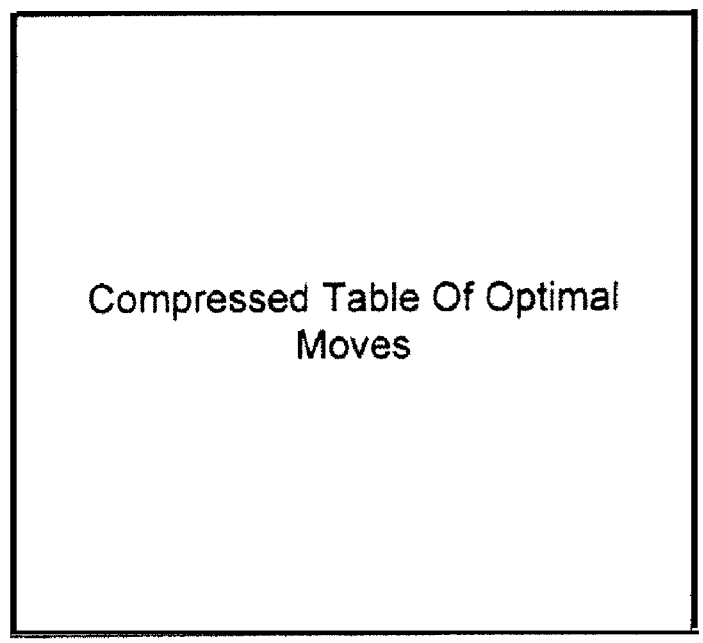
FIG. 5 illustrates a lookup table that is compressed table of optimal moves in accordance with one embodiment of the present invention.

It will be understood from the previous discussion that the read scheduler 135 may utilize a set of lookup tables to implement the function of a minimum cost read decision lookup table 140. FIGS. 3, 4, and 5 illustrate tables for an example in which up to six vectors may be scheduled by read scheduler 135. FIG. 3 illustrates exemplary separate input compression tables for vectors of size 1, 2, 3, and 4 in which the counts of the number of vectors of a particular size are mapped to a smaller number of buckets. FIG. 4 illustrates output compression in which a set of output numbers, such as output codes 0-16 are mapped to a minimal set of optimal moves. FIG. 5 illustrates an example of a compressed lookup table indicating optimal moves. The table of FIG. 5 is preferably compressed in two ways. First, it is compressed in that it is a set of optimal moves selected to favor frequently used moves. Second, it is compressed in that it uses output compression such that each move is indicated by an output code.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics system for rendering pixels, comprising:
   a transposer to transpose data of said graphics system from a first format into a second format, said transposer processing input data in said first format on a block-by-block basis per pass, with each block having a data transfer size and said transposer having at least one constraint on input data attributes capable of being processed per pass through said transposer; and
   a read scheduler to determine a read transfer order for scheduling blocks of work for said transposer for a set of input vectors, said read scheduler scheduling a sequence of block read operations for said transposer in which for each pass of said transposer said read scheduler utilizes a minimum cost analysis to determine a transfer of remaining input data for transposition consistent with said at least one constraint which will minimize the total number of passes to process said set of input vectors,
   wherein said read scheduler comprises a minimum cost lookup table defining an order for scheduling block read operations for said transposer, said minimum cost lookup table indicating a subsequent data transfer consistent with said at least one constraint which will minimize the total number of passes for said set of input vectors,
   wherein said minimum cost lookup table is organized to utilize a subset of all possible optimum block transfer moves that will minimize the number of passes for said set of input vectors wherein said subset is selected based on frequency.

2. The graphics system of claim 1, wherein said minimum cost lookup table is organized such that said subset utilizes a subset of frequently used moves that eliminates at least one redundant low-frequency move.

3. The graphics system of claim 1, wherein said at least one constraint includes a limit on the number of scalar inputs per pass.

4. The graphics system of claim 1, wherein said at least one constraint includes a limit on the number of sets of input attributes per pass.

5. The graphics system of claim 1, wherein said at least one constraint includes a limit on the number of scalar inputs per pass and a limit on the number of sets of input attributes per pass.

6. A graphics system for rendering pixels, comprising:
a transposer to transpose data of said graphics system from a first format into a second format, said transposer processing input data in said first format on a block-by-block basis per pass, with each block having a data transfer size and said transposer having at least one constraint on input data attributes capable of being processed per pass through said transposer; and
a read scheduler to determine a read transfer order for scheduling work for said transposer for a set of input vectors, said read scheduler utilizing a minimum cost lookup table to schedule a sequence of block read operations for said transposer in which for each pass of said transposer said lookup table indicates a subsequent block data transfer to said transposer consistent with said at least one constraint which will minimize the total number of passes for said set of input vectors, wherein said minimum cost lookup table is organized to utilize a subset of all possible optimum moves that will minimize the number of passes for said set of input vectors wherein said subset is selected based on frequency; and
a graphics pipeline utilizing said transposer to perform data assembly operations for rendering pixels.

7. The graphics system of claim 6, wherein said minimum cost lookup table is organized such that said subset utilizes a subset of frequently used moves that eliminates at least one redundant low-frequency move.

8. The graphics system of claim 6, wherein said at least one constraint includes a limit on the number of scalar inputs per pass.

9. The graphics system of claim 6, wherein said at least one constraint includes a limit on the number of sets of input attributes per pass.

10. The graphics system of claim 6, wherein said at least one constraint includes a limit on the number of scalar inputs per pass and a limit on the number of sets of input attributes per pass.

* * * * *